(12) United States Patent
Osada (10) Patent No.: US 8,333,610 B2
(45) Date of Patent: Dec. 18, 2012

(54) BATTERY CONNECTOR

(75) Inventor: Tsuyoshi Osada, Kanagawa (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 381 days.

(21) Appl. No.: 12/801,140

(22) Filed: May 25, 2010

(65) Prior Publication Data

US 2010/0304605 A1    Dec. 2, 2010

(30) Foreign Application Priority Data

May 26, 2009  (JP) .................................. 2009-126998

(51) Int. Cl.
 *H01R 31/08*  (2006.01)
(52) U.S. Cl. ....................................................... 439/513
(58) Field of Classification Search .................. 439/507, 439/511, 513
See application file for complete search history.

(56) References Cited

U.S. PATENT DOCUMENTS

2008/0293275 A1* 11/2008 Osada et al. ................... 439/188
2010/0304605 A1* 12/2010 Osada ........................... 439/507

FOREIGN PATENT DOCUMENTS

| JP | 58-500878 A | 5/1983 |
|----|----|----|
| JP | 11-162445 A | 6/1999 |
| JP | 2001-143683 A | 5/2001 |
| JP | 2001-155789 A | 6/2001 |
| JP | 2003-151526 A | 5/2003 |
| JP | 2003-533853 A | 11/2003 |
| JP | 2004-247244 A | 9/2004 |
| JP | 2007-048746 A | 2/2007 |
| JP | 2007-207648 A | 8/2007 |
| JP | 2009-519565 A | 5/2009 |
| WO | WO-82/04354 A1 | 12/1982 |
| WO | WO-01/89007 A2 | 11/2001 |
| WO | WO-2007/068120 A1 | 6/2007 |

* cited by examiner

*Primary Examiner* — James Harvey
(74) *Attorney, Agent, or Firm* — Rader, Fishman & Grauer PLLC (57) ABSTRACT

A battery connector includes a housing, a contact, a lid housing, and a pair of rotor rods. The housing includes at a bottom portion a pair of slit apertures into which a positive electrode and a negative electrode can be inserted. At the contact, a pair of movable strips contacts opposing surfaces of the positive electrodes and the negative electrodes. The lid housing fits to the housing. The pair of the rotor rods is supported so as to be rotatable at and adjoining with or spaced from both end portions of the lid housing. The contact includes a guide strip provided with a pair of cam grooves of a V-shape at both end portions, and when the lid housing is inserted into the housing, the contact moves the pair of the rotor rods to be adjoining each other and presses the positive and negative electrodes to the pair of the movable strips.

6 Claims, 10 Drawing Sheets

BATTERY CONNECTOR

This application is based on and claims the benefit of priority from Japanese Patent Applications No. 2009-126998, filed on 26 May 2009, the content of which is incorporated herein by reference.

BACKGROUND OF THE INVENTION

1. Field of the Invention

The present invention relates to a battery connector. The present invention specifically relates to a structure of a battery connector that electrically connects a positive electrode and a negative electrode that are adjacent to each other in a battery in which a battery cell such as a lithium-ion cell provided with a positive electrode and a negative electrode is laminated in a plate thickness direction.

2. Related Art

Recently, a battery, which is used as a module (a constituent unit) as a lithium-ion cell, has been employed in an electric vehicle that runs using an electric motor as a power generation source or in a hybrid vehicle that runs using an engine and an electric motor together. Furthermore, such a battery has been employed in a plug-in hybrid vehicle (an electric vehicle) that can be charged by way of a domestic power source.

For example, a battery cell such as a lithium-ion cell has a structure in which a pair of a positive electrode and a negative electrode formed by a thin plate tab terminal is made to project outwardly. Such a battery cell is multiply provided, and the orientations of the battery cells are alternately changed and arranged in a multi-column manner so that positive electrodes are adjacent to negative electrodes and these positive and negative electrodes are electrically connected to each other in series, thereby enabling to obtain a high-capacity battery.

Such a structure of the battery as described above is disclosed in Japanese Unexamined Patent Application Publication No. H11-162445 (hereinafter, referred to as Patent Document 1). According to Patent Document 1, a battery box has a plurality of battery cells arranged in a multi-column manner therein and connects a positive electrode with a negative electrode adjacent with each other by a cable (an electrical cable) so as to configure a battery in which a plurality of battery cells are connected in series.

In regard to the structure of the battery in Patent Document 1, although not described explicitly in the specification, it can be inferred that it is necessary to wire a terminal of the cable by way of fixing by threads.

Generally, in such a battery, a band plate bus bar is interposed between a positive electrode and a negative electrode adjacent to each other and the battery is connected by tightening using a bolt or nut. That is, the positive electrode and the negative electrode are fastened by so-called connection by bolting.

Accordingly, a large amount of time would be spent on operations for connecting a plurality of battery cells. If it is possible to realize a battery connector that can connect a positive electrode with a negative electrode to each other so as to be easily detached, it will be easy to operate a connection of a plurality of battery cells, so that a degraded battery cell can be easily replaced with a healthy battery cell.

On the other hand, an electrode such as of a lithium-ion cell of recent years has become greatly reduced in plate thickness. Therefore, for the reason that this electrode is easily buckled or deformed, it is not easy to realize a battery connector that connects a positive electrode with a negative electrode adjacent to each other so as to be easily detached.

SUMMARY OF THE INVENTION

The present invention is made in view of such a problem and has an object of providing a battery connector that connects a positive electrode and a negative electrode adjacent to each other so as to be easily detached in a battery in which battery cells having thin plate positive and negative electrodes projected therefrom are laminated in a plate thickness direction.

According to a first aspect of the present invention, a battery connector that shorts a positive electrode and a negative electrode that are adjacent, in a battery laminating in a thickness direction thereof battery cells provided with a pair of the positive electrode and the negative electrode of a thin plate shape that projects outwardly, and connects a plurality of the battery cells in series, is provided in which the battery connector includes: a housing including a pair of concave portions that opens at a bottom portion a pair of slit apertures into which a pair of the positive and negative electrodes that are adjacent can be inserted; a contact that includes a pair of movable strips having both wings of a base end portion being bent and opening in a U-shape, the pair of the movable portions being held in the pair of the concave portions of the housing, and the pair of movable strips contacting opposing surfaces of the positive electrode and the negative electrode that are adjacent; a lid housing that covers the pair of the concave portions and fits with the housing; a pair of elongated rotor rods that is supported so as to be rotatable at and adjoining with or spaced from both end portions of the lid housing; and guide strips which are both end portions of the contact provided with a pair of cam grooves that cause the pair of the rotor rods to be adjoining each other and press the positive and negative electrodes that are adjacent into the pair of the movable strips when inserting the lid housing into the housing.

Here, the housing and the lid housing have insulation properties. A housing and a lid housing with insulation properties may be those made of nonconductive materials, and by molding a synthetic resin, a housing and a lid housing having insulation properties in desired shapes can be obtained.

The housing may be in a rectangular shape, where a rectangular housing indicates that a battery connector according to this invention is a rectangular connector having a rectangular coupling face. Then, this housing includes a rectangular opening that is coupled with the lid housing.

In addition, "a pair of concave portions" that the housing includes indicates that an inside of the housing is divided into two by a dividing wall extending in a longitudinal direction. Then, a pair of slit apertures is opened at bottom portions of these concave portions.

According to a second aspect of the present invention, the battery connector is provided according to the first aspect, in which: the battery projects the positive electrode and the negative electrode that are adjacent, and includes a case that covers an upper portion of a pair of the battery cells that are adjacent; the housing includes a pair of first lances that stands from a dividing wall dividing the pair of the concave portions and faces each other, and a pair of second lances disposed at both end portions of the housing and deformable toward inside of each other; the lid housing includes a pair of engaging strips that projects from inside thereof, each of tip portions thereof being inverted in a U-shape in an opposing orientation, and a pair of wedge strips that can be inserted between an outer wall at both end portions of the housing and the pair of the second lances; the pair of the first lances includes first hook strips that face each other; the pair of the second lances includes second hook strips that face in opposing directions to each other; the pair of engaging strips is engaged with a pair of the first hook strips and includes an engaging protrusion that makes it difficult for the lid housing to be separated from the housing and third hook strips that face in opposing directions to each other; and the case includes a third lance that can be engaged with a pair of the third hook strips and a pair of engaging grooves that engage with a pair of the second hook strips.

In the first or second aspect, the pair of the movable strips is integrated or intermittent over the longitudinal direction thereof.

The abovementioned "intermittent" can include, for example, a configuration in which a pair of movable strips is divided uniformly and a uniformly-distributed load can be applied to the rotor rod of which both ends are supported. Accordingly, deflection (warpage) of the rotor rod can be easily suppressed. It is preferable for a number of contact points to be provided at these movable strips, and providing a number of contacts over a longitudinal direction of the movable strip contributes to a reduction in contact resistance.

In addition, the rotor rods are made of a metal rod having rigidity, and, for example, a stainless rod is preferable.

In the abovementioned second aspect, the lid housing includes a pair of observation windows that allow verification of an engaging state of the pair of the third lances and the pair of the engaging strips.

According to a third aspect of the present invention, the battery connector according to the second aspect is provided in which the lid housing includes a pair of release openings, and the battery connector includes a unlocking mechanism of a battery connector in which, using a releasing tool having a pair of sharply-angled pawls for separating the battery connector from the case, the pair of the sharply-angled pawls provided to the releasing tool is inserted into the pair of the release openings that is open at the lid housing, and the pair of the engaging strips is deformed in directions facing each other, so that the battery connector is caused to be separated from the case.

DETAILED DESCRIPTION OF THE INVENTION

The present inventors have found that these objects can be solved by employing a structure of a ZIF (Zero Insertion Force) connector, which requires little force, in order to insert or remove a connector, and thus, based on this fact, achieved the invention of a new battery connector as follows. Embodiments for implementing the present invention are described below with reference to the drawings.

Figure 1:
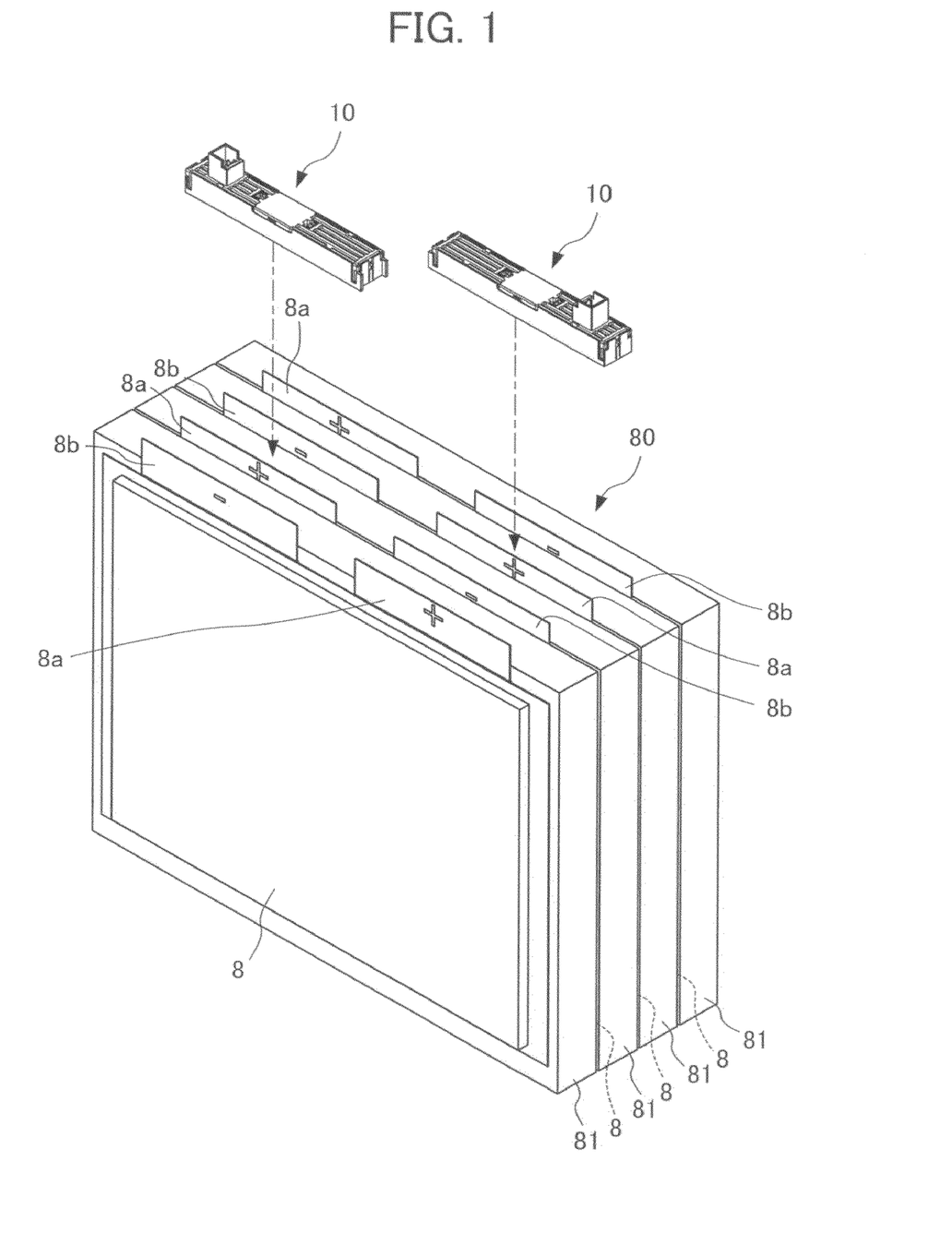
FIG. 1 is a perspective view showing a state in which a battery connector and a battery connected to the battery connector according to an embodiment of the present invention are disposed so as to face to each other.

FIG. 1 is a perspective view showing a state in which a battery connector and a battery connected to the battery connector according to an embodiment of the present invention are disposed so as to face with each other.

Figure 2:
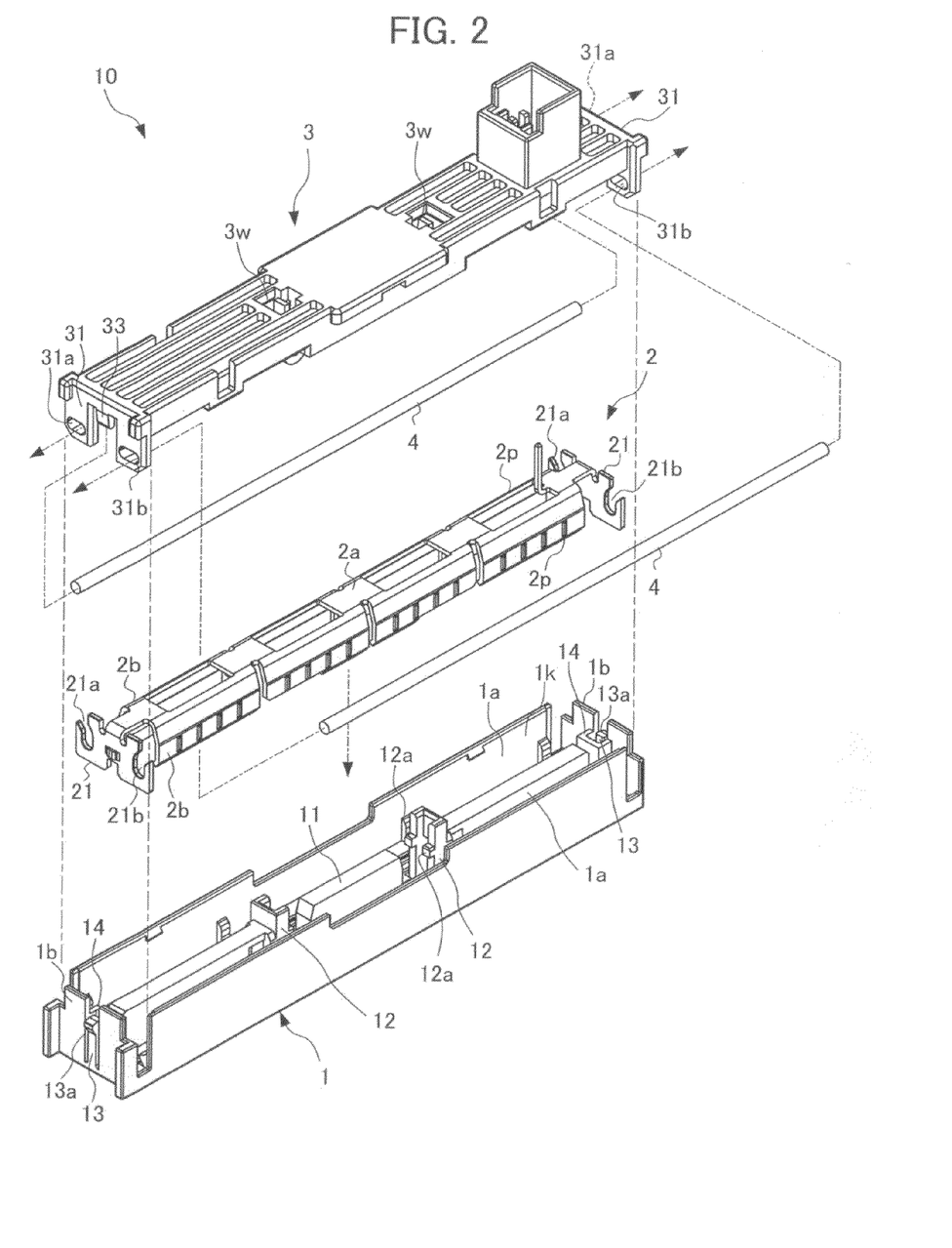
FIG. 2 is an exploded perspective view showing a configuration of the battery connector according to the embodiment.
Figure 3:
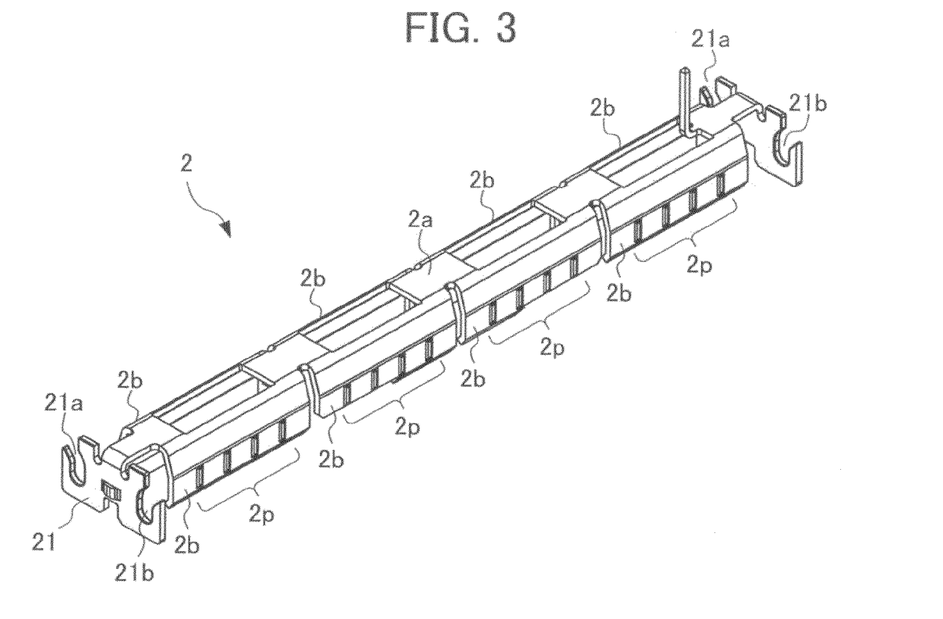
FIG. 3 is a perspective view showing an outer appearance of a contact that is provided to the battery connector according to the embodiment.
Figure 4:
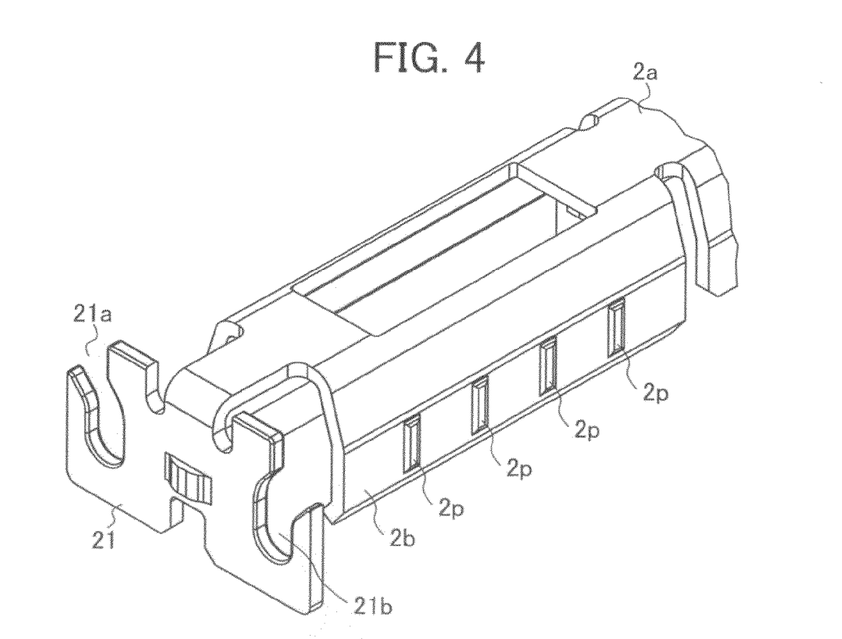
FIG. 4 is an enlarged perspective view of a portion of FIG. 3.
Figure 5:
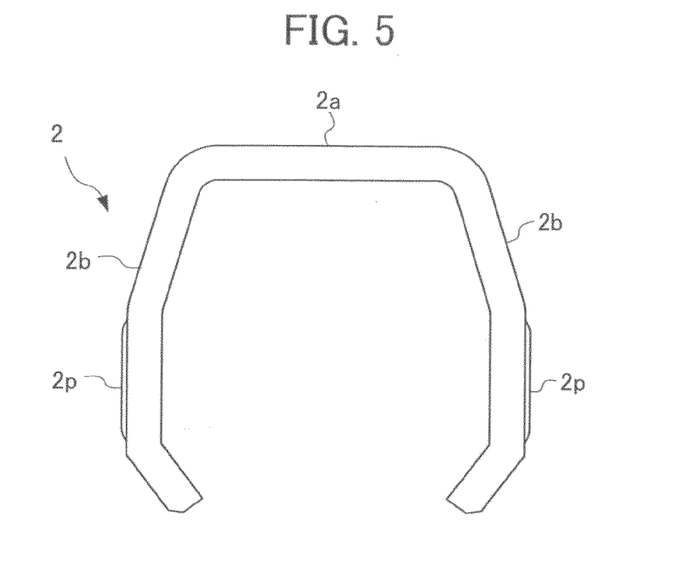
FIG. 5 is a vertical cross-sectional view of a contact provided to a battery connector according to the embodiment.

FIG. 2 is an exploded perspective view showing a configuration of the battery connector according to the embodiment. FIG. 3 is a perspective view showing an outer appearance of a contact that is provided to the battery connector according to the embodiment. FIG. 4 is an enlarged perspective view of a portion of FIG. 3. FIG. 5 is a vertical cross-sectional view of a contact provided to a battery connector according to the embodiment.

Figure 6:
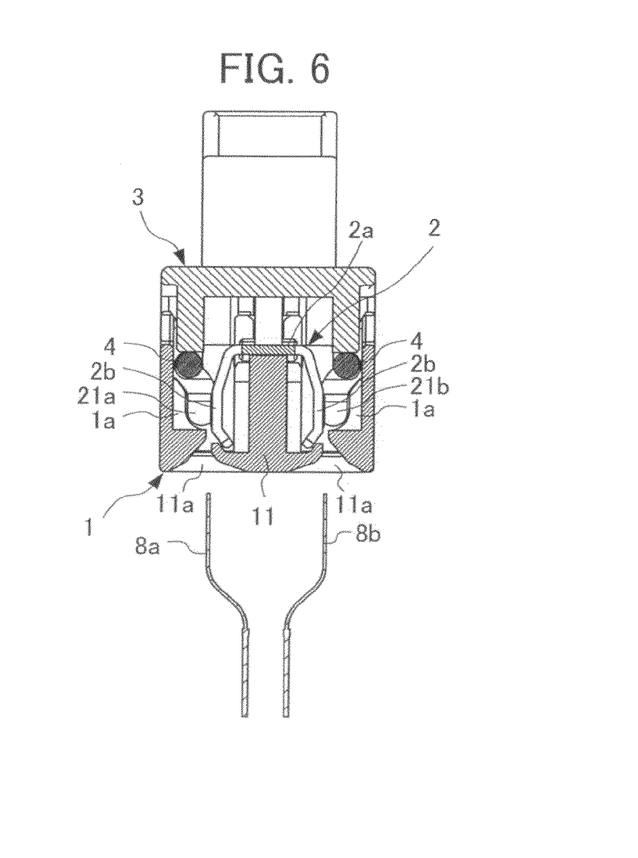
FIG. 6 is a vertical cross-sectional view of a battery connector according to the embodiment and shows a state before a positive electrode and a negative electrode adjacent to each other are inserted.
Figure 7:
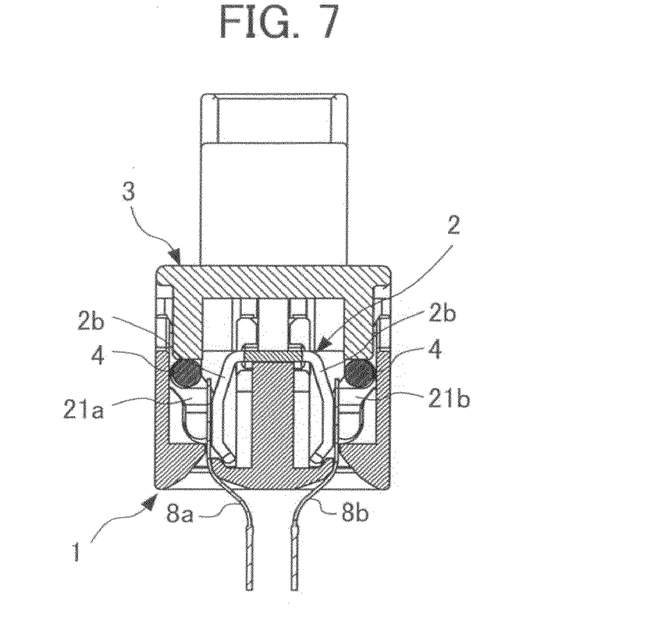
FIG. 7 is a vertical cross-sectional view of a battery connector according to the embodiment and shows a state in which a positive electrode and a negative electrode adjacent to each other are inserted.

In addition, FIG. 6 is a vertical cross-sectional view of a battery connector according to the embodiment, and shows a state before a positive electrode and a negative electrode adjacent to each other are inserted. FIG. 7 is a vertical cross-sectional view of a battery connector according to the embodiment, and shows a state in which a positive electrode and a negative electrode adjacent to each other are inserted.

Figure 8:
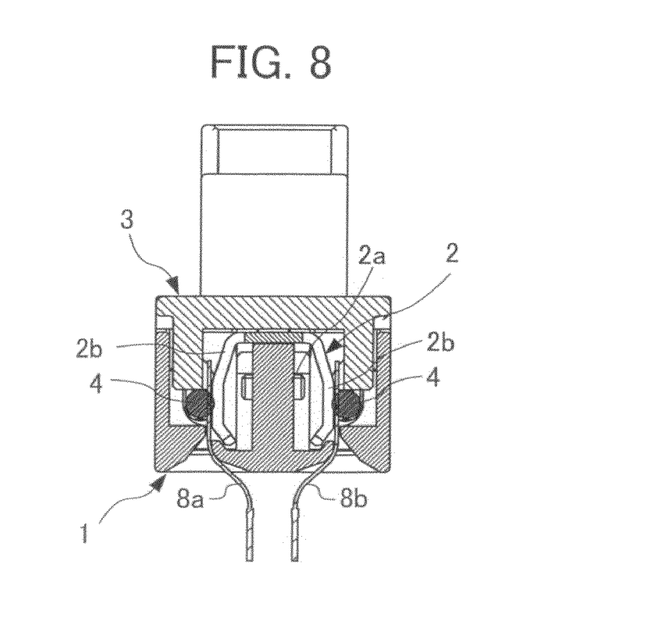
FIG. 8 is a vertical cross-sectional view of a battery connector according to the embodiment and shows a state in which a positive electrode and a negative electrode adjacent to each other are connected.

FIG. 8 is a vertical cross-sectional view of a battery connector according to the embodiment, and shows a state in which a positive electrode and a negative electrode adjacent to each other are connected.

With reference to FIG. 1, a battery cell 8 is composed of a lithium-ion cell, for example, and includes a pair of a positive electrode 8a and a negative electrode 8b formed by a thin plate tab terminal projecting outwardly. The battery 80 includes a plurality of battery cells 8, and the orientations of each of the battery cells 8 are alternately arranged, so that positive electrodes 8a are adjacent to negative electrodes 8b, and laminated in a plate thickness direction of the battery cells 8. The battery cells 8 as shown are respectively held in cases 81, and these cases 81 are coupled in a multi-layered manner.

With reference to FIG. 1, a battery connector 10 (hereinafter, abbreviated as a connector) according to an embodiment of the present invention connects the positive electrodes 8a and the negative electrodes 8b of a plurality of the battery cells 8 adjacent to each other. Thus, a plurality of the battery cells 8 are connected in series. In practice, a plurality of the connectors 10 is arranged on the upper portion of the battery 80 in a staggered grid manner.

With reference to FIG. 2, the connector 10 is provided with a square housing 1 and a channel-like contact 2 that is opened in a U-shape. The housing 1 includes a pair of concave portions 1a and 1a. These concave portions 1a and 1a are opened at a bottom portion so as to be made slit apertures 11a and 11a into which the positive electrode 8a and the negative electrode 8b adjacent to each other can be inserted (see FIG. 6).

With reference to FIGS. 2 to 5, the contact 2 is composed of sheet metal and includes a pair of movable strips 2b and 2b made by both wings of a base end portion 2a being bent by way of molding the expanded sheet metal. For example, a copper alloy plate that excels in shapeability and conductive properties can be used as the sheet metal. Furthermore, not only a copper alloy plate, but also any element that excels in shapeability and conductive properties can be selected. With reference to FIG. 6, a pair of the movable strips 2b and 2b is held in a pair of the concave portions 1a and 1a. Then, with reference to FIG. 7, a pair of the movable strips 2b and 2b can contact the opposing surfaces of the positive electrode 8a and the negative electrode 8b.

In addition, with reference to FIG. 2, the connector 10 is provided with a lid housing 3 and a pair of elongated rotor rods 4 and 4. The lid housing 3 covers a pair of the concave portions 1a and 1a and fits the housing 1. A pair of the rotor rods 4 and 4 is supported so as to be rotatable at and adjoining with or spaced from both end portions of the lid housing 3.

With reference to FIGS. 2 to 4, the contact 2 includes a pair of guide strips 21 and 21 on both end portions. A pair of the guide strips 21 and 21 is provided with a pair of cam grooves 21a and 21a. When inserting the lid housing 3 into the housing 1, these cam grooves 21a and 21a cause a pair of the rotor rods 4 and 4 to move close to each other, so that the positive electrode 8a and the negative electrode 8b adjacent to each other are pressed toward a pair of the movable strips 2b and 2b.

With reference to FIG. 2, the housing 1 includes a rectangular aperture 1k that is coupled with the lid housing 3. In addition, the inside of the housing 1 is divided in two by means of a dividing wall 11 extending in a longitudinal direction. Then, a pair of the slit apertures 11a and 11a is open at the bottom portion of a pair of the concave portions 1a and 1a.

With reference to FIGS. 1 and 6, when attaching the connector 10 to the battery 80, the positive electrode 8a and the negative electrode 8b adjacent to each other can be inserted into a pair of the slit apertures 11a and 11a.

With reference to FIGS. 2 and 6, the base end portion 2a of the contact 2 is attached to the dividing wall 11 of the housing 1. Then, a pair of the movable strips 2b and 2b are disposed so as to straddle the dividing wall 11, and a pair of the movable strips 2b and 2b are received in a pair of the concave portions 1a and 1a. Each of the movable strips 2b can be elastically deformed to be bent when a load is added such as a cantilever-like plate spring.

With reference to FIG. 1 or 6 and FIG. 7, when the connector 10 is attached to the battery 80, the connector 10 can be slid to contact with the opposing surfaces of the positive electrode 8a and the negative electrode 8b adjacent to each other without a pair of the movable strips 2b and 2b being elastically deformed. The connector 10 according to an embodiment of the present embodiment is made a structure which requires little force for inserting or removing the positive electrode 8a and the negative electrode 8b adjacent to each other into or from the contact 2.

With reference to FIGS. 3 and 4, a trajectory of movement of a pair of the cam grooves 21a and 21b opens at an angle in substantially a V-shape. With reference to FIGS. 7 and 8, when the lid housing 3 advances toward the housing 1, a pair of the rotor rods 4 and 4 are guided by a pair of cam grooves 21a and 21b so that a pair of the rotor rods 4 and 4 can be moved in a direction in which a pair of the rotor rods 4 and 4 becomes close to each other.

With reference to FIGS. 7 and 8, when moving the lid housing 3 away from the housing 1, a pair of the rotor rods 4 and 4 are guided by a pair of cam grooves 21a and 21b so that a pair of the rotor rods 4 and 4 can be moved in a direction in which the pair of the rotor rods 4 and 4 spaced from each other.

With reference to FIG. 2, a pair of support strips 31 and 31 that face each other is provided at both end portions of the lid housing 3. A pair of elongated holes 31a and 31b is formed at the support strip 31. These elongated holes 31a and 31b are formed in a hole shape that extends in a direction orthogonal to the direction in which the lid housing 3 advances to the housing 1.

With reference to FIG. 2, by supporting end portions of a pair of the rotor rods 4 and 4 at a pair of the elongated holes 31a and 31b, the pair of the rotor rods 4 and 4 can be supported so as to be rotatable at and adjoining with or spaced from the lid housing 3.

With reference to FIG. 2, relative movement of the pair of the rotor rods 4 and 4 is regulated (limited) by a pair of the elongated holes 31a and 31b and a pair of the cam grooves 21a and 21b. In addition, the connector according to an embodiment of the present invention converts linear movement of the lid housing 3 into open-close movement of the pair of the rotor rods 4 and 4.

With reference to FIGS. 2 and 3, a pair of the movable strips 2b and 2b is divided uniformly (intermittently) over a longitudinal direction. Therefore, a uniformly-distributed load can be applied to the rotor rod 4 of which both ends are supported. With reference to FIGS. 2 and 4, a pair of movable strips 2b and 2b is provided with a number of contact points that slightly project from the surface. Contact resistance can be reduced by providing a number of contact points 2p over a longitudinal direction of the movable strip 2b.

With reference to FIG. 2, the rotor rod 4 is composed of a metal rod having rigidity. As a metal rod having rigidity, for example, a stainless rod is preferable, which can suppress deflection of the rotor rod 4.

Next, an operation and effect of the connector 10 according to an embodiment of the present invention are described.

With reference to FIGS. 7 and 8, the lid housing 3 and a pair of the rotor rods 4 and 4 can be moved as one body. In the process of fitting the lid housing 3 to the housing 1, movement of a pair of the rotor rods 4 and 4 is regulated by a pair of the cam grooves 21a and 21b.

Furthermore, with reference to FIGS. 7 and 8, in the process of fitting the lid housing 3 to the housing 1, an outer wall of the lid housing 3 is regulated by an inner wall of the housing 1, and the lid housing 3 is only allowed to move linearly with respect to the housing 1.

On the other hand, with reference to FIGS. 7 and 8, the contact 2 and a pair of the rotor rods 4 and 4 configure a cam device that affords an open-close movement to a pair of the rotor rods 4 and 4, and thus the contact 2 and a pair of the rotor rods 4 and 4 configure a special cam in which a pair of rotor rods 4 and 4 is made a follower for a pair of the cam grooves 21a and 21b provided at the guide strip 21 of the contact 2. It can be said that the lid housing 3 configures a frame that supports the follower.

With reference to FIGS. 7 and 8, when advancing the lid housing 3 toward the housing 1, a pair of the rotor rods 4 and 4, guided by a pair of cam grooves 21a and 21b, moves in directions approaching each other. On the other hand, when moving the lid housing 3 away from the housing 1, a pair of the rotor rods 4 and 4, guided by a pair of cam grooves 21a and 21b, moves in directions away from each other.

With reference to FIG. 8, in a state in which the lid housing 3 is completely fitted with the housing 1, a pair of the rotor rods 4 and 4 biases a force in directions to close a pair of the movable strips 2b and 2b together via the positive electrode 8a and the negative electrode 8b adjacent to each other. Then, the elastic rebound force of a pair of the movable strips 2b and 2b can apply a predetermined contact pressure to the positive electrode 8a and the negative electrode 8b adjacent to each other.

Thus, for the connector 10 according to the embodiment of the present invention, when the lid housing 3 fits to the housing 1, a pair of the rotor rods 4 and 4 is caused to adjoin each other and depress the positive electrode 8a and the negative electrode 8b adjacent to each other towards a pair of the movable strips 2b and 2b, whereby a predetermined contact pressure as reaction can be applied to the positive electrode 8a and the negative electrode 8b adjacent to each other.

Furthermore, for the connector 10 according to the embodiment of the present invention, a pair of the rotor rods 4 and 4 is rotatably supported by the lid housing 3. Therefore, in a process of fitting the lid housing 3 to the housing 1, since a pair of the rotor rods 4 and 4 moves while rolling toward the adjacent positive electrode 8a and negative electrode 8b, there is an advantage in that surfaces of the adjacent positive electrode 8a and negative electrode 8b are not easily damaged.

Moreover, as described above, for the connector 10 according to the embodiment of the present invention, since a ZIF structure is employed in order to make the positive electrode 8a and the negative electrode 8b contact with the contact 2, there is an advantage in that a buckling load does not act on the positive electrode 8a and the negative electrode 8b. Therefore, even electrodes (the positive electrode and the negative electrode) having a thin plate thickness can contact the contact 2 without being buckled and deformed.

In addition, for the connector 10 according to the embodiment of the present invention, when the adjacent positive electrode 8a and negative electrode 8b are inserted into the housing 1, a pair of the rotor rods 4 and 4 enter an open state and are spaced from the adjacent positive electrode 8a and negative electrode 8b, and thus, there is an advantage in that variation in positions of the adjacent positive electrode 8a and negative electrode 8b (manufacturing error or assembly error) can be allowed. Then, when a pair of the rotor rods 4 and 4 becomes a state enters a closed state, it acts so as to correct variation in the positions of the adjacent positive electrode 8a and negative electrode 8b.

With reference to FIGS. 7 and 8, for the connector 10 according to the embodiment of the present invention, since the adjacent positive electrode 8a and negative electrode 8b are in contact with both end portions of the contacts 2, which is open in a U-shape, a distance between a pair of contact points 2p and 2p becomes short. Therefore, minimization of bulk resistivity can be realized (refer to FIG. 5).

Next, in addition to the explanation for the configuration of the battery connector according to an embodiment of the present invention, a configuration and operation of a lock mechanism according to an embodiment of the present invention is described.

Figure 9:
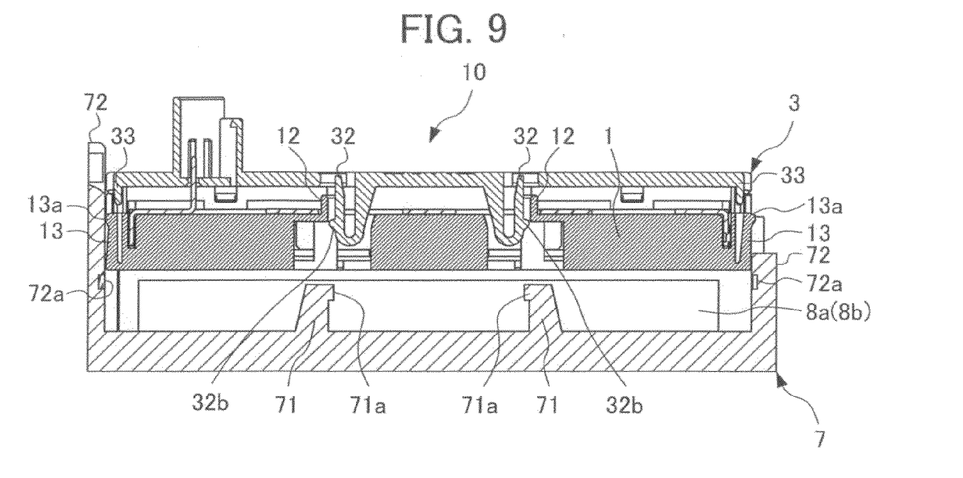
FIG. 9 is a vertical cross-sectional view of the battery connector according to the embodiment and shows a state in which the lid housing is half fitted with the housing.
Figure 10:
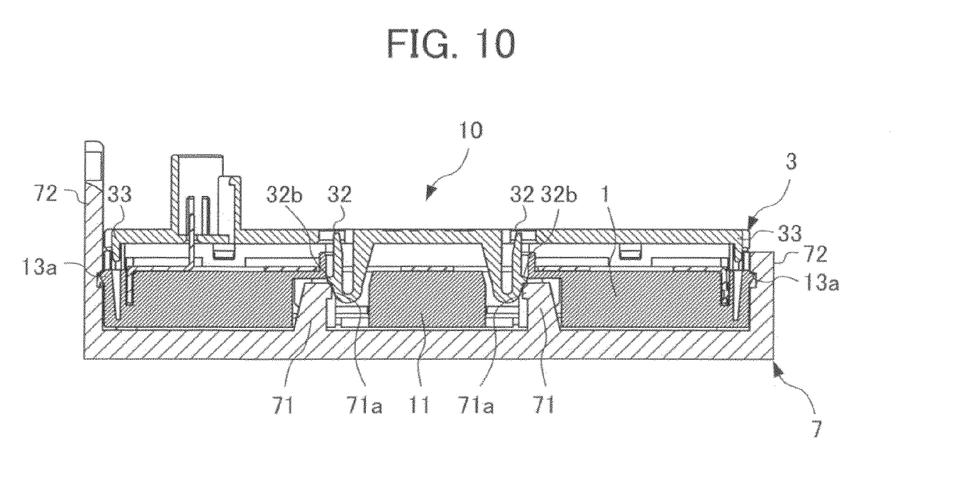
FIG. 10 is a vertical cross-sectional view of the battery connector according to the embodiment and shows a state in which the battery connector in a half fitted state abuts a case.
Figure 11:
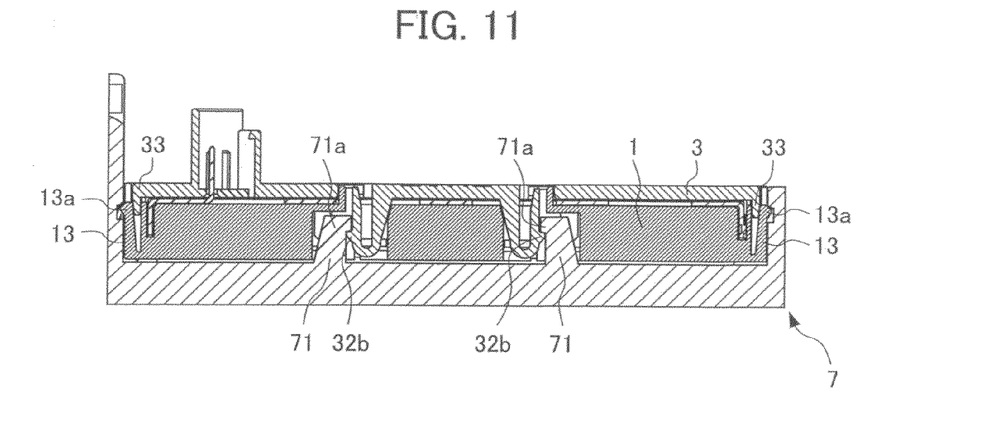
FIG. 11 is a vertical cross-sectional view of the battery connector according to the embodiment and shows a state in which the battery connector is completely fitted to a case.

FIG. 9 is a vertical cross-sectional view of the battery connector according to the abovementioned embodiment, and shows a state in which the lid housing is half fitted with the housing. FIG. 10 is a vertical cross-sectional view of the battery connector according to the abovementioned embodiment, and shows a state in which the battery connector in a half fitted state abuts a case. FIG. 11 is a vertical cross-sectional view of the battery connector according to the abovementioned embodiment, and shows a state in which the battery connector is completely fitted with a case.

Figure 12:
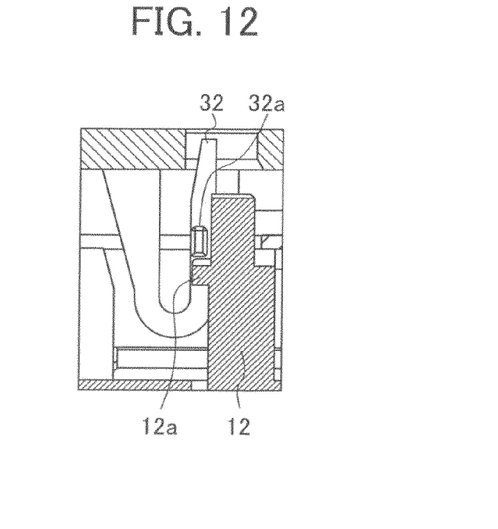
FIG. 12 is a vertical cross-sectional view in which a substantial part of FIG. 10 is enlarged.
Figure 13:
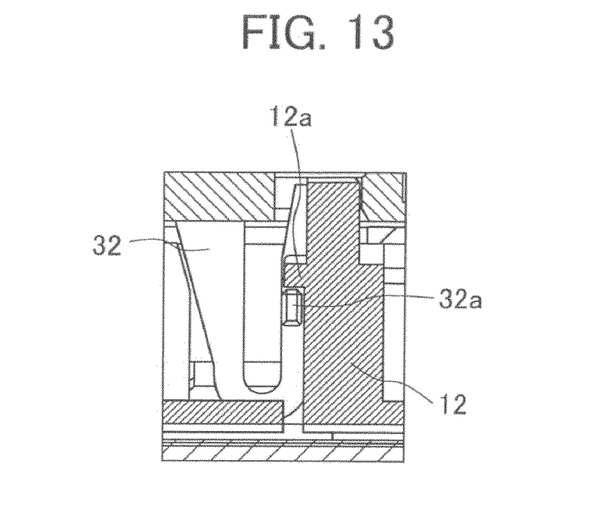
FIG. 13 is a vertical cross-sectional view in which a substantial part of FIG. 11 is enlarged.

In addition, FIG. 12 is a vertical cross-sectional view in which a substantial part of FIG. 10 is enlarged. FIG. 13 is a vertical cross-sectional view in which a substantial part of FIG. 11 is enlarged.

With reference to FIGS. 1 and 9 to 11, the battery 80 is provided with a plastic case 7. In the case 7, the adjacent positive electrode 8a and the negative electrode 8b project, and the case 7 covers upper portions of a pair of adjacent battery cells 8 and 8. Although FIG. 1 omits illustration of the case 7, the case 7 is held across a pair of the cases 81 and 81.

With reference to FIGS. 9 to 11, in the case 7, has a pair of third lances 71 and 71 projecting at a central part thereof. These third lances 71 and 71 are provided with a pair of fourth hook strips 71a and 71a facing each other at an apex thereof.

In addition, with reference to FIGS. 9 to 11, the case 7 projects has, on both wings, a pair of guide strips 72 and 72 which guides outer walls 1b and 1b (refer to FIG. 2) at both end portions of the housing 1. A pair of engaging grooves 72a and 72a that can be engaged with a pair of second hook strips 13a (described later) are bored into an opposing surface (an inner wall) of these guide strips 72 and 72. That is to say, in a case of attaching the connector 10 to the battery, it is preferable to provide guide strips 72 and 72 that guide the housing properly on a battery side (the case 7) so that the adjacent positive electrode 8a and the negative electrode 8b are guided properly.

With reference to FIGS. 2 and 9 to 11, the housing 1 includes a pair of first lances 12 and 12 that faces with each other at a central part thereof. A pair of the first lances 12 and 12 stands from the dividing wall 11 that divides a pair of the concave portions 1a and 1a.

In addition, with reference to FIGS. 2 and 9 to 11, the housing 1 includes a pair of second lances 13 and 13 that can be deformed toward inside each other. A pair of the second lances 13 and 13 is disposed at both end portions of the housing 1.

With reference to FIGS. 9 to 11, the lid housing 3 includes a pair of engaging strips 32 and 32. A pair of the engaging strips 32 and 32 projects from inside of the lid housing 3 and each tip portion thereof is inverted in a U-shape in an opposing direction.

Furthermore, with reference to FIGS. 2 and 9 to 11, the lid housing 3 includes a pair of wedge strips 33 and 33. A pair of the wedge strips 33 and 33 can be inserted between the outer walls 1b and 1b at both end portions of the housing 1 and a pair of the second lances 13 and 13.

With reference to FIG. 2, the second lance 13 is surrounded by the concave portion 14 and a tip portion of the second lance 13 is disposed so as to be retactable. Then, the outer wall 1b includes this concave portion 14. Therefore, in other words, a pair of the wedge strips 33 and 33 can be inserted between the concave portions 14 and 14 at both end portions of the housing and a pair of the second lances 13 and 13.

With reference to FIG. 2 or 12 and FIG. 13, a pair of the first lances 12 and 12 includes first hook strips 12a and 12a that face with each other. It should be noted that the first hook strip 12a indicates a pair of protrusions that face in opposing directions to each other.

On the other hand, with reference to FIGS. 12 and 13, a pair of the engaging strips 32 and 32 includes engaging protrusions 32a and 32a that are engaged with a pair of the first hook strips 12a and 12a. These engaging protrusions 32a and 32a make it difficult for the lid housing 3 to be separated from the housing 1 by being engaged with a pair of the first hook strips 12a and 12a. In addition, a pair of the engaging strips 32 and 32 includes third hook strips 32b and 32b that face in opposing directions to each other.

In addition, with reference to FIGS. 2 and 9 to 11, a pair of the second lances 13 and 13 includes, at tip portions thereof, second hook strips 13a and 13a that face in opposing directions to each other.

With reference to FIGS. 9 and 12, when inserting the lid housing 3 to the housing 1, a pair of the first hook strips 12a and 12a abuts a pair of the engaging protrusions 32a and 32a. In addition, a pair of the third hook strips 32b and 32b is locked at the inner wall of the housing 1, and the lid housing 3 and the housing 1 are in a half fitted state.

With reference to FIGS. 9 and 10, when inserting the connector 10 in a half fitted state into the case 7, a pair of the third hook strips 32b and 32b abuts an apex of a pair of the third lances 71 and 71. When inserting the lid housing 3 into the housing 1, a pair of the engaging strips 32 and 32 is elastically deformed in a direction approaching each other.

When a pair of the engaging protrusions 32a and 32a crosses over a pair of the first hook strips 12a and 12a (refer to FIG. 13), a pair of the engaging strips 32 and 32 is elastically rebounded in a direction spaced from each other, so that a pair of the engaging protrusions 32a and 32a is engaged with a pair of the first hook strips 12a and 12a.

With reference to FIGS. 11 as well as 13, a pair of the third lances 71 and 71 (the fourth hook strips 71a and 71a) engages with a pair of the third hook strips 32b and 32b. Then, the half fitted state shown in FIGS. 10 and 12 is overcome, and a complete fitted state can be achieved that makes it difficult for the lid housing 3 to be separated from the housing 1 and the case 7 (i.e. the battery).

Furthermore, with reference to FIG. 11, since a pair of the second hook strips 13a and 13a is engaged with a pair of the engaging grooves 72a and 72a and a pair of the wedge strips 33 and 33 is inserted between the outer walls 1b and 1b at both end portions of the housing 1 and a pair of the second lances 13 and 13, a state of CPA (Connector Position Assurance) can be achieved which makes it difficult for the connector 10 to be separated from the case 7.

The connector 10 according to the embodiment of the present invention realizes CPA that secures fitting of the lid housing 3 and the housing 1, as well as fitting of the connector 10 and the battery 80. Since a pair of the wedge strips 33 and 33 are inserted between the outer walls 1b and 1b at both end portions of the housing 1 and a pair of the second lances 13 and 13, it becomes difficult for the connector 10 to separate from the case 7 (i.e. the battery).

The connector 10 according to the embodiment of the present invention is preferable for a battery dedicated to a vehicle in which vibrations are likely to be generated. In order to release the fitting of lid housing and the housing, it is preferable to employ a particular releasing tool (described later).

With reference to FIGS. 2 and 9, the lid housing 3 includes a pair of observation windows that allow an engaging state of a pair of the third lances 71 and 71 and a pair of the engaging strips 32 and 32 to be verified. In this embodiment, a pair of release openings 3w and 3w (described later) in the lid housing 3 serve as observation windows. It should be noted that, other than this embodiment, observation windows may be formed in particular which allow an engaging state of a pair of the third lances 71 and 71 with a pair of the engaging strips 32 and 32 to be verified. Regarding the connector 10 according to the embodiment of the present invention, since the lid housing 3 includes a pair of the observation windows (for example, 3w and 3w) that allow the engaging state of a pair of the third lances 71 and 71 with a pair of the engaging strips 32 and 32 to be verified, inspection is easy.

Next, an unlocking method employing an unlocking mechanism for the connector 10 according to an embodiment of the present invention is explained.

Figure 14:
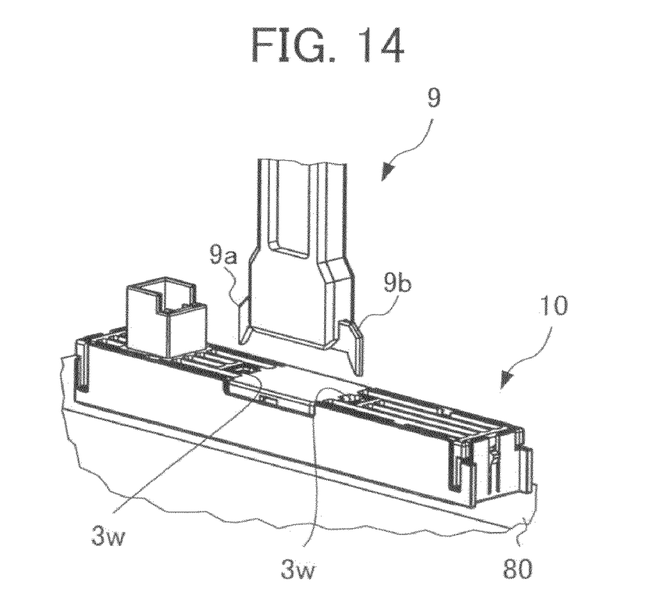
FIG. 14 is a perspective view showing an outer appearance of a releasing tool that releases fitting of a battery connector according to the embodiment, and a vertical cross-sectional view showing a state before releasing fitting.
Figure 15:
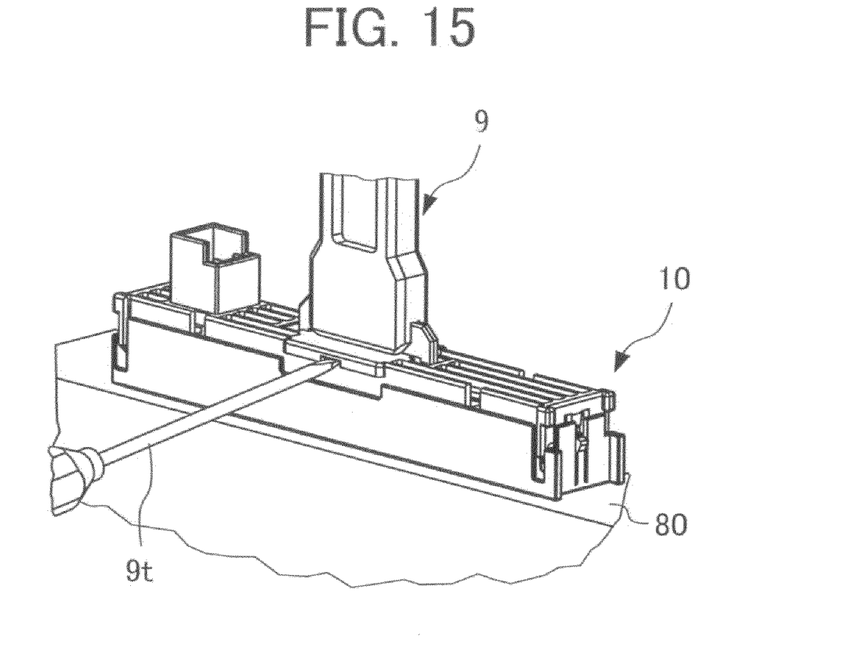
FIG. 15 is a perspective view showing an outer appearance of a releasing tool that releases fitting of a battery connector according to the embodiment, and a view showing a state in which a pair of pawls is inserted into a battery connector.

FIG. 14 is a perspective view showing an outer appearance of a releasing tool that releases fitting of a battery connector according to the embodiment, and a vertical cross-sectional view showing a state before releasing fitting. FIG. 15 is a perspective view showing an outer appearance of the releasing tool that releases fitting of a battery connector according to the embodiment, and a view showing a state in which a pair of pawls is inserted into a battery connector.

Figure 16:
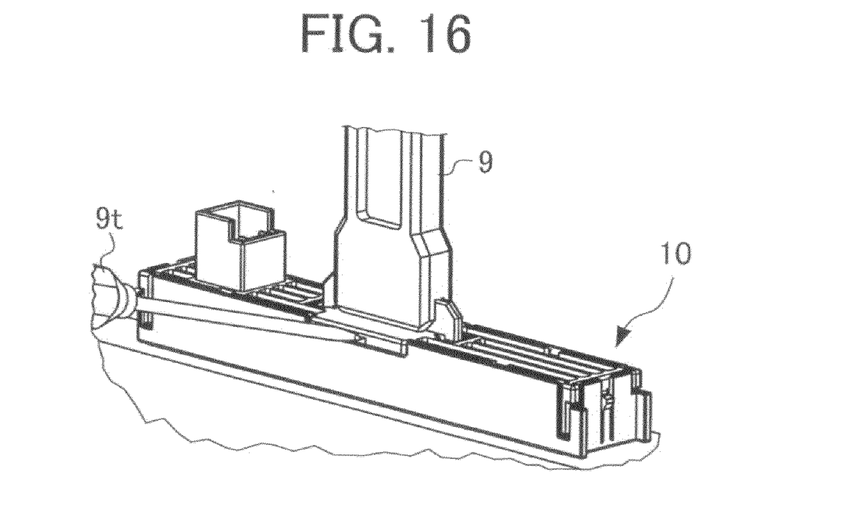
FIG. 16 is a perspective view showing an outer appearance of a releasing tool that releases fitting of a battery connector according to the embodiment, and a view showing a state in which a tool is inserted into a battery connector.
Figure 17:
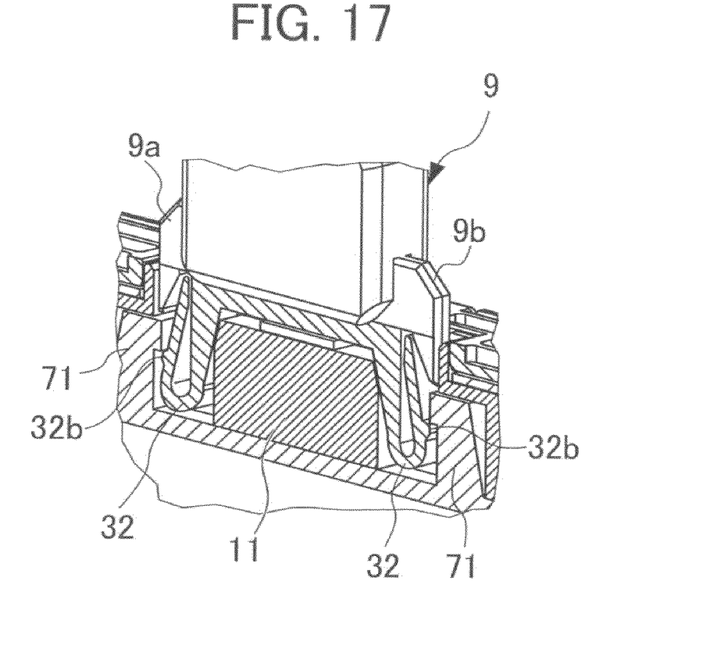
FIG. 17 is an enlarged perspective view of a substantial part of FIG. 16, and cuts away to show an inside of a battery connector.
Figure 18:
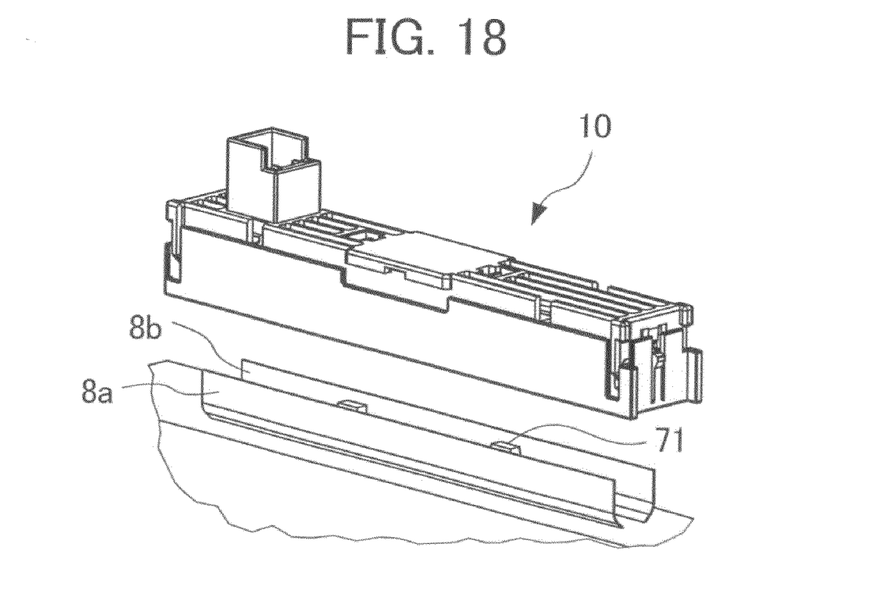
FIG. 18 is a perspective view of a battery connector according to the embodiment, and shows a state in which a battery connector of which fitting is released is separated from a battery.

FIG. 16 is a perspective view showing an outer appearance of the releasing tool that releases fitting of a battery connector according to the embodiment, and a view showing a state in which a tool is inserted into a battery connector. FIG. 17 is an enlarged perspective view of a substantial part of FIG. 16, and cuts away to show inside of a battery connector. FIG. 18 is a perspective view of a battery connector according to the embodiment, and shows a state in which a battery connector of which fitting is released is separated from a battery.

With reference to FIG. 14, a releasing tool 9 includes a pair of sharply-angled pawls 9a and 9b at tips thereof. Then, a pair of the pawls 9a and 9b is inserted into a pair of release openings 3w and 3w opened in the lid housing 3. In addition, as shown in FIG. 15, the tip of a tool (so called a slotted screwdriver) 9t is put between the lid housing 3 and the housing 1.

With reference to FIG. 17, a pair of the pawls 9a and 9b causes a pair of the engaging strips 32 and 32 to deform in directions facing each other inside the connector 10. Therefore, as shown in FIG. 16, when rotating a tip of the tool 9t, fitting of the lid housing 3 with the housing 1 and fitting of the lid housing 3 with the third lance 71 are released. As a result of this, the connector 10 can be separated from the case 7 (refer to FIGS. 9 and 19).

Since the unlocking method employing the unlocking mechanism for the connector 10 according to an embodiment of the present invention is performed based on an unlocking mechanism that releases the fitting of the connector 10 with the case 7 (i.e. the battery) employing a particular releasing tool, it is possible to prevent fraudulent activities by an unspecified third party.

The battery connector according to the present invention is not limited to the embodiments and, although a square housing is exemplified in the embodiments, the present invention is not limited thereto and can be changed depending on the batteries and another condition. In addition, for example, the rotor rod 4 is not limited to a metal rod and can be selected from another material. In addition, although the cam mechanism (a bearing portion) and the contact are integrally formed by way of a metal sheet by virtue of ease of manufacturing, the cam mechanism (a bearing portion) may be treated separately and a synthetic resin may be used for molding.

Furthermore, although movement of a pair of the rotor rods 4 and 4 is restricted using the cam device, a link mechanism or a gear mechanism can be used.

Although the battery connector according to the present invention exemplifies a lithium-ion cell, the targets for connecting of the battery connector according to the present invention includes all kinds of cells provided with a pair of thin plate positive and negative electrodes that projects outwardly.

What is claimed is:

1. A battery connector that shorts a positive electrode and a negative electrode that are adjacent, in a battery laminating in a thickness direction thereof battery cells provided with a pair of the positive electrode and the negative electrode of a thin plate shape that projects outwardly, and connects a plurality of the battery cells in series, the battery connector comprising:
   a housing including a pair of concave portions that opens at a bottom portion a pair of slit apertures into which a pair of the positive and negative electrodes that are adjacent can be inserted;
   a contact that includes a pair of movable strips having both wings of a base end portion being bent and opening in a U-shape, the pair of the movable strips being held in the pair of the concave portions of the housing, and the pair of movable strips contacting opposing surfaces of the positive electrode and the negative electrode that are adjacent;
   a lid housing that covers the pair of the concave portions and fits with the housing;
   a pair of elongated rotor rods that is supported so as to be rotatable at and adjoining with or spaced from both end portions of the lid housing; and
   guide strips which are at both end portions of the contact provided with a pair of cam grooves that cause the pair of the rotor rods to be adjoining each other and press the positive and negative electrodes that are adjacent into the pair of the movable strips when inserting the lid housing into the housing.

2. The battery connector according to claim 1, wherein:
   the battery projects the positive electrode and the negative electrode that are adjacent, and includes a case that covers an upper portion of a pair of the battery cells that are adjacent;
   the housing includes a pair of first lances that stands from a dividing wall dividing the pair of the concave portions and faces each other, and a pair of second lances disposed at both end portions of the housing and deformable toward inside of each other;
   the lid housing includes a pair of engaging strips that projects from inside thereof, each of tip portions thereof being inverted in a U-shape in an opposing orientation, and a pair of wedge strips that can be inserted between an outer wall at both end portions of the housing and the pair of the second lances;
   the pair of the first lances includes first hook strips that face each other;
   the pair of the second lances includes second hook strips that face in opposing directions to each other;
   the pair of engaging strips is engaged with a pair of the first hook strips and includes an engaging protrusion that makes it difficult for the lid housing to be separated from the housing and third hook strips that face in opposing directions to each other; and
   the case includes a third lance that can be engaged with a pair of the third hook strips and a pair of engaging grooves that engage with a pair of the second hook strips.

3. The battery connector according to claim 1, wherein the pair of the movable strips is integrated or intermittent over a longitudinal direction thereof.

4. The battery connector according to claim 3, wherein the rotor rod is made of a metal rod having rigidity.

5. The battery connector according to claim 2, wherein the lid housing includes a pair of observation windows that allow an engaging state of the pair of the third lances and the pair of the engaging strips to be verified.

6. The battery connector according to claim 2, wherein the lid housing includes a pair of release openings, and the battery connector includes a unlocking mechanism of a battery connector in which, using a releasing tool having a pair of sharply-angled pawls for separating the battery connector from the case, the pair of the sharply-angled pawls provided to the releasing tool is inserted into the pair of the release openings that is open at the lid housing, and the pair of the engaging strips is deformed in directions facing each other, so that the battery connector is caused to be separated from the case.

* * * * *